Figure 1:
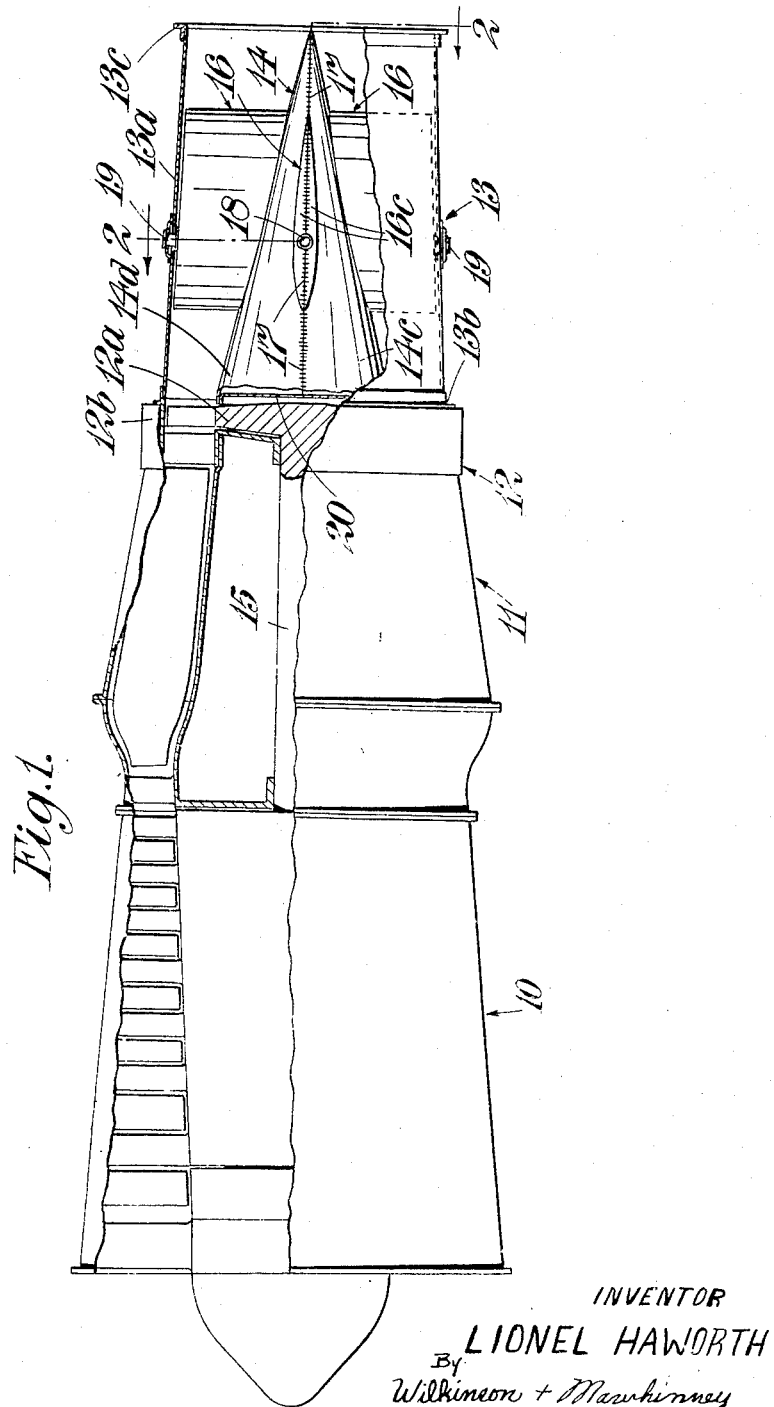

Aug. 11, 1953     L. HAWORTH     2,648,353
DUCT STRUCTURE FOR GAS-TURBINE ENGINES
Filed May 4, 1951     6 Sheets-Sheet 1

INVENTOR
LIONEL HAWORTH
By Wilkinson + Mawhinney
ATTORNEYS

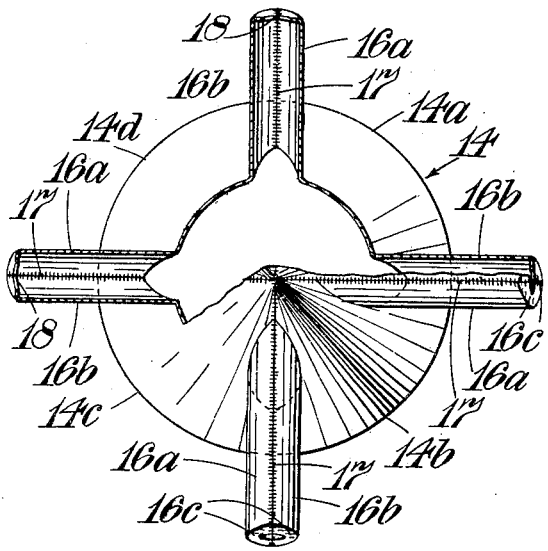
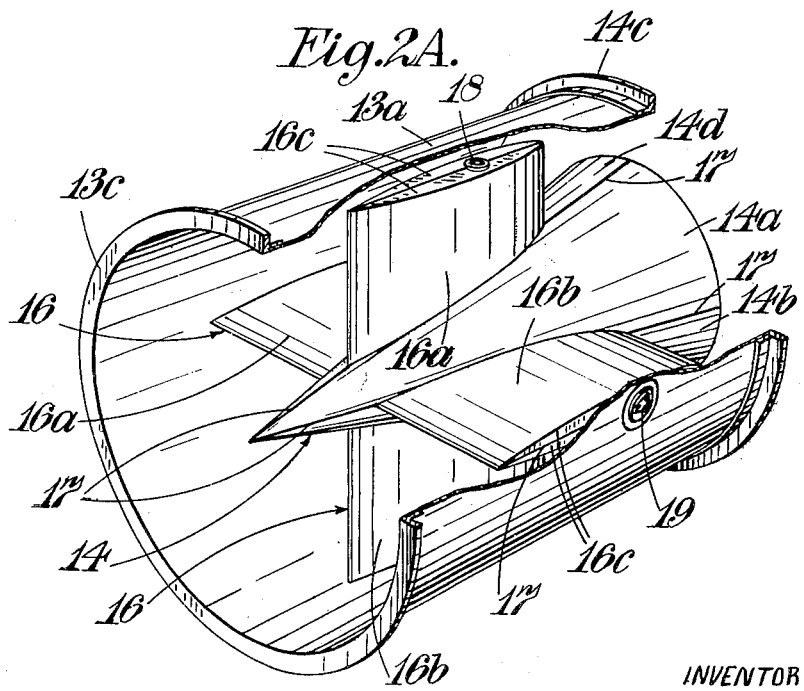

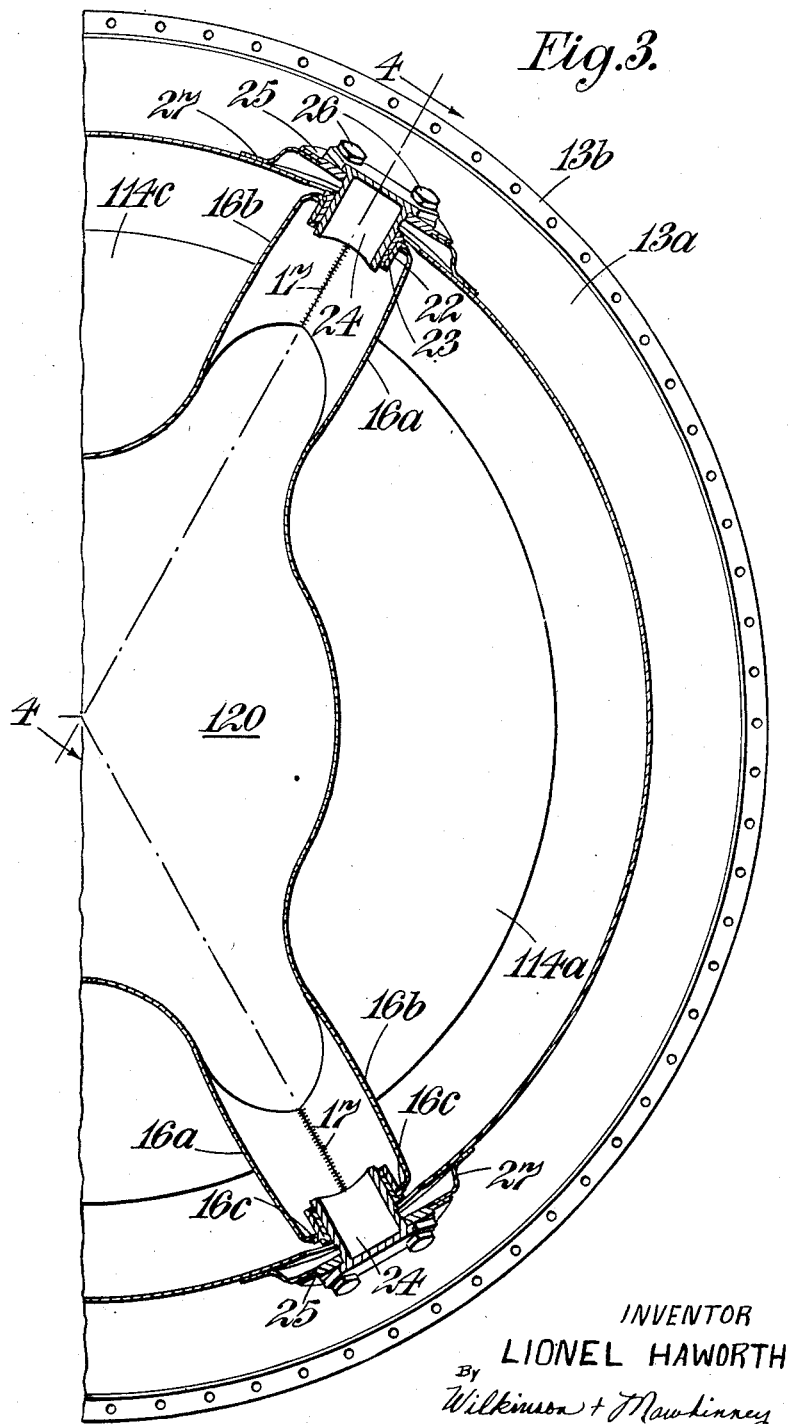

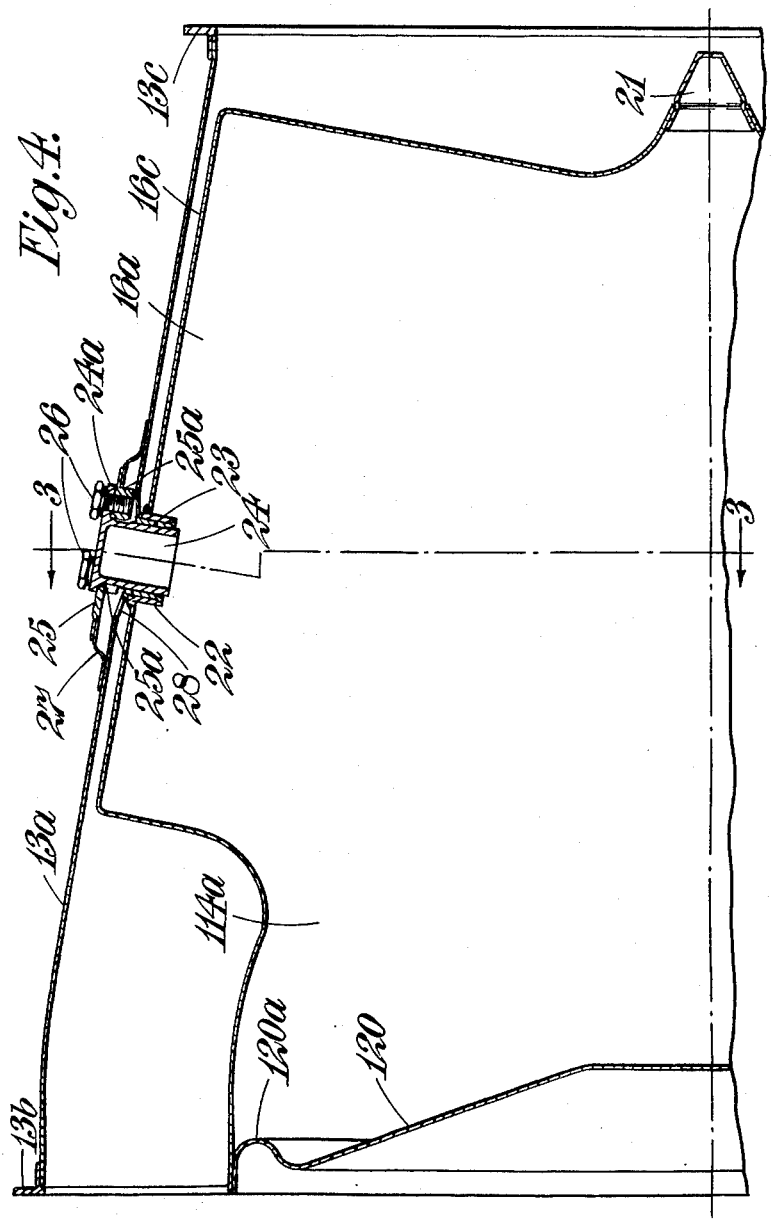

Aug. 11, 1953  L. HAWORTH  2,648,353
DUCT STRUCTURE FOR GAS-TURBINE ENGINES
Filed May 4, 1951  6 Sheets-Sheet 5
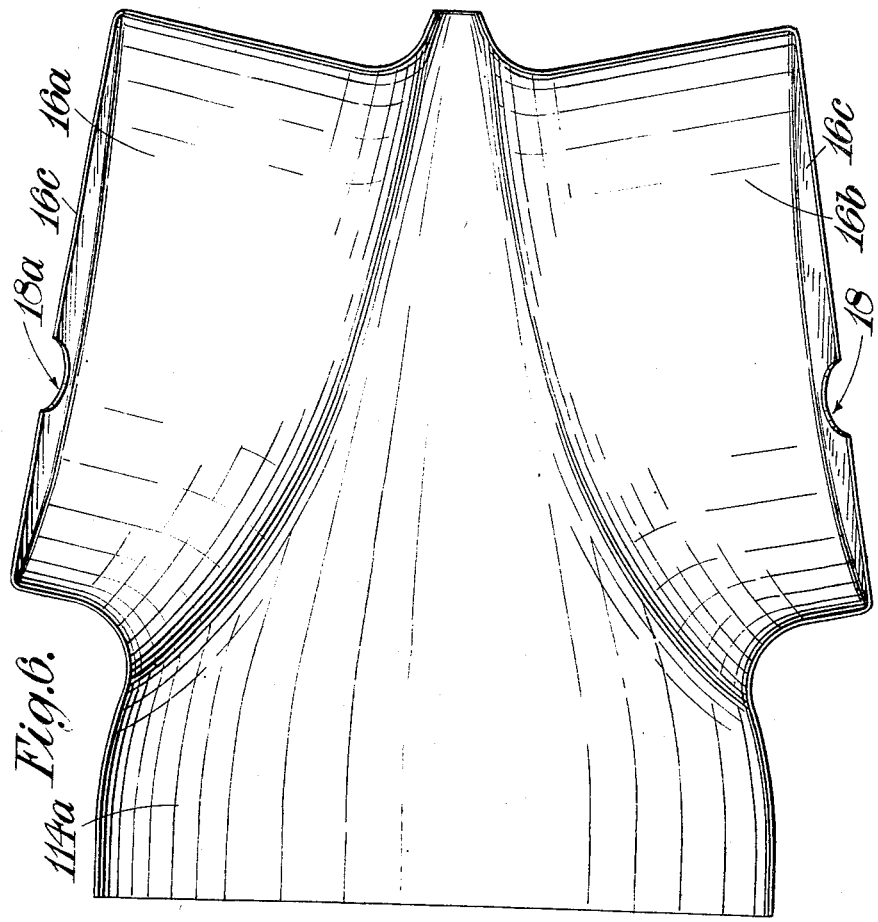
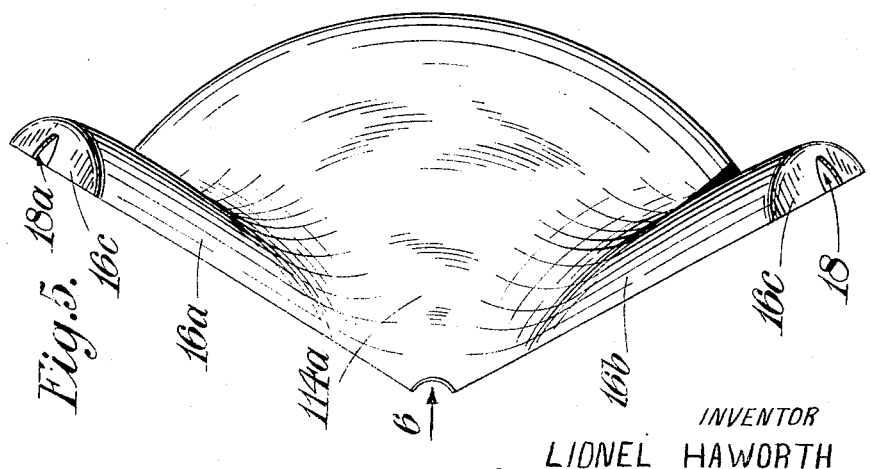
INVENTOR
LIONEL HAWORTH
By Wilkinson + Mawhinney
ATTORNEYS

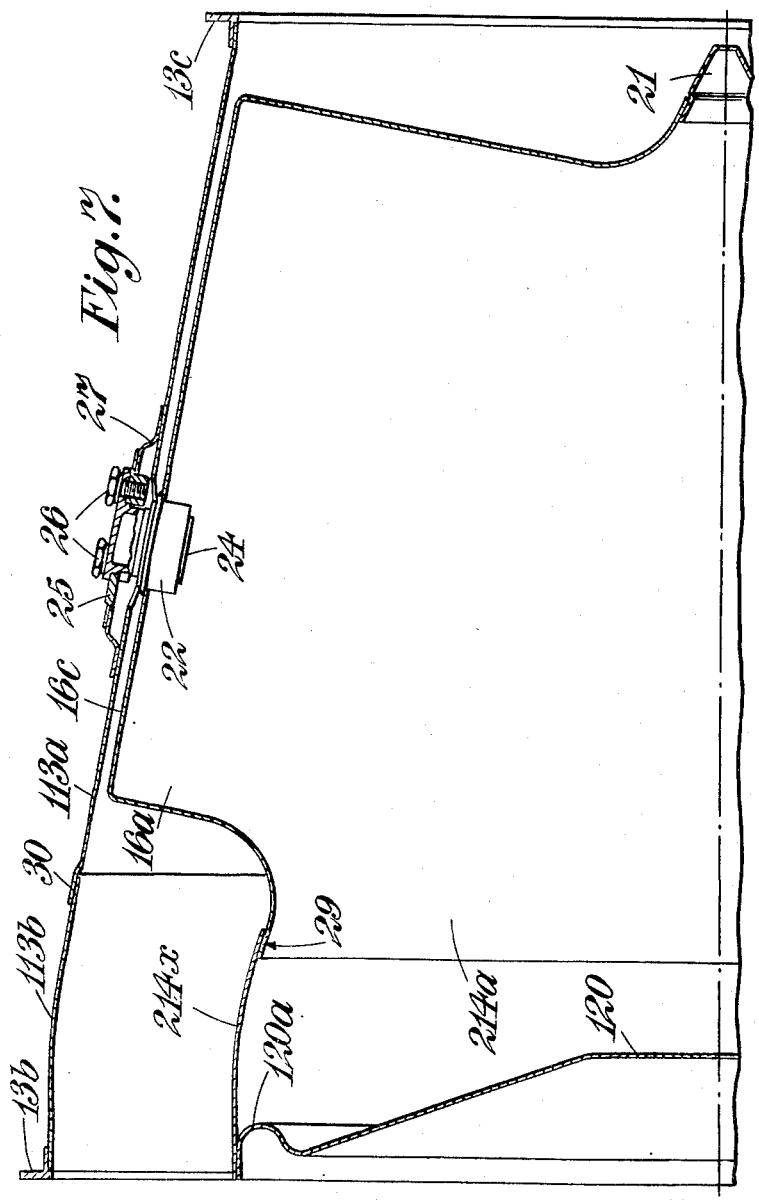

Patented Aug. 11, 1953

2,648,353

UNITED STATES PATENT OFFICE 2,648,353

DUCT STRUCTURE FOR GAS-TURBINE ENGINES

Lionel Haworth, Littleover, England, assignor to Rolls-Royce Limited, Derby, England, a British company Application May 4, 1951, Serial No. 224,509
In Great Britain May 17, 1950

17 Claims. (Cl. 138—37)

This invention relates to gas-turbine engine structures and is concerned with an annular duct structure of an engine comprising an inner wall, an outer tubular wall and strut members by which one wall is supported from the other coaxial wall of the duct. The strut members extend across the annular duct formed by the inner and outer walls. Such a structure will hereinafter be referred to as "a gas-turbine engine working fluid duct structure of the type specified," and the wall part which is supported from the other coaxial wall part will be referred to as "a wall part of the type specified."

One example of a gas-turbine engine working fluid duct structure of the type specified is the exhaust assembly of an axial-flow turbine, which commonly comprises a substantially conical fairing co-operating with an outer tubular wall to form an annular exhaust passage which at one end registers with the turbine outlet annulus.

Various means have been provided for supporting wall parts of the type specified from the coaxial wall and one such means comprised a series of tubular struts arranged at an angle to one another and arranged to extend across the working fluid passage from one part to the other. Where such a supporting arrangement is provided it is usual to enclose the supporting struts in aerofoil shaped fairings.

This invention has for an object to provide a novel construction of a gas-turbine engine working fluid duct structure of the type specified, whereby the overall weight of the structure may be reduced and manufacture facilitated.

According to this invention a gas-turbine engine working fluid duct structure of the type specified comprises a wall part of the type specified formed as a unit with strut members by which it is supported from a co-axial wall structure, and the wall-and-strut structural unit is formed from a number of similar sheet-metal pressings, each of which pressings provides a portion of each of a pair of adjacent aerofoil-section strut members, each of which portions affords a circumferentially-directed strut surface, and the segmental portion of the wall part which extends between and interconnects said adjacent strut members.

Preferably each pressing comprises the whole of one circumferentially-directed face of each strut from the leading edge of the aerofoil section to the trailing edge thereof, so that when the pressings are brought together in assembly they may be welded together or otherwise bonded over abutting leading and trailing edges of the strut portions and also over abutting axial continuations of these edges along the surface of the wall portion.

In the above preferred arrangement it will be seen that a wall part of the type specified has formed as a unit with it a series of sheet-metal aerofoil-section fairings which can act as the supporting struts for the wall part, and the shape of each pressing from which the unit is formed may be considered as the shape obtained by cutting the wall-and-strut structure into a number of parts along axial planes which contain the leading and trailing edges of the aerofoil fairings.

Preferably, according to a feature of this invention, each pressing may comprise at the free end of each aerofoil-section strut, an end wall portion which, when the unit is supported from a coaxial wall, lies close to the surface of said coaxial wall. This end wall portion provides a convenient means for connecting the unit with the coaxial wall. For instance, the abutting end wall portions of adjacent pressings may be cut away to afford an aperture to receive a collar in which is engaged a spigot carried on the coaxial wall, so that the unit is located with respect to the coaxial wall but is capable of relative expansion thereto.

The invention has an important application in exhaust assemblies for axial-flow turbines and may be applied with advantage in the construction of the substantially conical fairings such as are commonly employed with such exhaust assemblies.

The application of the invention in such an exhaust arrangement will now be described in detail by way of illustration of the invention, reference being made in the description to the accompanying drawings, in which—

Figure 1 is a view of a gas-turbine engine having an exhaust arrangement embodying the invention, Figure 2 is a view on the line 2—2 of Figure 1, Figure 2A is a perspective view of the exhaust arrangement of Figure 2 with parts broken away, Figure 3 is an axial sectional view of an alternative construction of exhaust arrangement to that shown in Figure 2, the section being on the line 3—3 of Figure 4, Figure 4 is a section on the line 4—4 of Figure 3, Figure 5 is an axial view on one of the pressings forming part of the arrangement of Figures 3 and 4, Figure 6 is a view in the direction of arrow 6 (Figure 5) of the pressing shown in Figure 5, and Figure 7 is a view similar to Figure 4 showing a modification.

Referring to Figure 1, there is illustrated a conventional gas-turbine engine of the reaction propulsion type. The engine illustrated comprises a compressor 10, combustion equipment 11 connected to receive compressed air from the compressor 10 to have fuel burnt in it; and an axial-flow turbine 12 connected to receive the products of combustion from the combustion equipment 11. The turbine comprises a turbine rotor 12a, drivingly connected to the rotor of the compressor 10 by a shaft 15, and a turbine casing 12b.

The engine illustrated also comprises an exhaust assembly 13 supported from the turbine casing 12b. The exhaust assembly is of the kind comprising an outer tubular duct wall 13a, one end of which is secured by bolting flange 13b to the outlet end of the turbine casing 12b and which may be cylindrical or vary in diameter, for instance may have a taper so as to be frusto-conical, and a conical bullet 14 supported coaxially within the outer wall 13a to form an annular exhaust gas passage leading from the turbine outlet. The wall 13a has a bolting flange 13c at its outlet end by which a jet pipe and propelling nozzle may be secured in place.

The conical bullet is supported from the outer wall 13a of the exhaust assembly, and in this embodiment is made up from four sheet-metal pressings 14a, 14b, 14c, 14d which are so shaped that the bullet 14 is formed as a unit with four aerofoil-section struts 16 which extend across the annular exhaust duct formed between the outer wall 13a and the conical bullet 14, the combined bullet and strut unit being attached to the outer wall 13a of the exhaust assembly through the outer ends of the struts 16.

It will be seen from Figures 1 and 2 that each of the sheet metal pressings 14a, 14b, 14c, 14d comprises three essential portions, whereof two portions 16a, 16b are each formed as half of an aerofoil-section strut 16 and the third portion is that quarter of the conical bullet 14 which interconnects the strut portions 16a, 16b. The two strut portions 16a, 16b thus afford facing circumferentially-directed surfaces of a pair of adjacent struts. Each pressing also includes an end portion 16c for the outer end of each strut portion 16a, 16b. The pressings 14a, 14b, 14c, 14d are assembled together with their edges in abutment and are conveniently welded together as indicated at 17 so that the weld is effected along the leading and trailing edges of the struts 16 and along lines on the conical surface of the bullet 14 and on the surfaces of the end portions 16c of the struts which are continuations of and are in this case in the same axial plane as the leading and trailing edges of the struts 16. The end portions 16c of the struts 16 are formed with apertures 18 which are engaged by radial pegs or spigots 19 mounted on the wall 13a so that the combined bullet and strut unit is centrally located within the wall 13a but is free to expand radially with respect to it.

The base of the conical bullet 14 is closed by a sheet metal plate 20.

It will be appreciated that the number of struts 16 may be varied and also that the pressings which have the strut portions formed in one with them need not, when secured together, afford the whole of the surface of the conical bullet 14.

For instance, referring to Figures 3 and 6, there is illustrated an arrangement in which there are three pressings 114a, 114b, 114c each having portions 16a, 16b affording facing circumferentially-directed surfaces of adjacent struts 16, the central planes of which struts 16 are, as will best be seen from Figures 3 and 5, inclined to one another at 120°.

In this construction, moreover, the part conical portion afforded by each pressing does not include the apex of the cone and in this particular arrangement a small substantially conical cup 21 is secured in positon in the aperture left when the three pressings 114a, 114b, 114c are secured together to close the aperture and to provide the apex of the conical bullet 14.

In this construction moreover the base of the conical bullet is closed by a sheet-metal pressing 120 which is dished and has a peripheral corrugation 120a for strengthening purposes.

As in the previously described construction, the free ends of the strut portions 16a, 16b are provided with an end portion 16c and the combined conical bullet and strut unit is supported from the wall 13a by substantially radial pegs engaging in holes formed by registering semi-circular notches 18a (Figures 5 and 6) in the abutting edges of the end portions 16c. Conveniently a flanged sleeve 22 is fitted in the hole formed by the registering notches 18a and the sleeve has a cylindrical liner 23 fitted in it. The liner 23 is engaged by a spigot-like plug 24 having at its outer end a flange 24a by which the spigot-like plug 24 may be bolted to a flat ring 25. The ring 25 is conveniently formed with internally threaded bosses 25a to receive the plug-retaining setscrews 26, and is itself welded to the periphery of an aperture in a dished sheet-metal patch 27 mounted on the outer wall 13a of the exhaust assembly above a hole 28 in the outer wall 13a.

A similar arrangement to that illustrated in Figures 3 to 6 is illustrated in Figure 7. In the arrangement shown in Figure 7, however, not only do the pressings which combine both portions of the conical bullet and supporting struts 16, terminate short of the apex end of the conical bullet but also terminate short of the base end of the conical bullet. The pressings such as the pressing 214a terminate just upstream of the strut portions and the base end of the conical bullet is formed by an annular sheet-metal member 214x, the upstream end of which receives the base 120 of the conical bullet and the downstream end of which overlaps, as indicated at 29, the upstream edges of the pressings such as the pressing 214a. The pressings such as the pressing 214a and the annular sheet-metal member 214x are conveniently welded together at the overlap 29.

In this construction moreover the outer wall of the exhaust assembly is formed in two parts of which a part 113a extends axially substantially to the same extent as do the pressings such as the pressing 214a, and of which the part 113b extends from the upstream end of the exhaust assembly substantially to the upstream end of the pressings. The parts 113a, 113b overlap, as indicated at 30, and are welded together at this point.

The construction described with reference to Figure 7 is especially suitable for exhaust assemblies in which the exhaust gases on leaving the turbine are turned to flow in a direction at an angle to the turbine axis.

From the foregoing description it will be seen that each sheet-metal pressing, such as the pressings 14a, 14b, 14c, 14d, the pressings 114a, 114b, 114c and the pressings such as the pressing 214a, may each be considered as affording that portion of the combined conical bullet and strut unit which is contained between a pair of axial planes drawn through the leading and trailing edges of a pair of adjacent struts 16 at least for the axial extent of the struts 16.

Moreover, it will be seen that the invention provides a simple unit comprising both a working fluid duct wall and struts for supporting the wall, which unit is easy to manufacture and can be supported from a coaxial wall in a simple manner. The construction of the invention also enables a substantial saving in the weight of a structure embodying the invention as compared with known arrangements.

I claim:

1. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of struts extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and a portion of each of said adjacent pair of said struts, and integral joints interconnecting said metal pressings.

2. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of struts extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and a portion of each of said adjacent pair of said struts, and weld metal interconnecting said pressings.

3. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of struts extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and a portion of each of said adjacent pair of said struts, and integral joints interconnecting said metal pressings; and means for positioning said inner wall unit from said outer tubular wall comprising peg means mounted on the outer tubular wall and engaging in apertures in the outer ends of said struts.

4. An exhaust duct structure as claimed in claim 3, wherein the apertures in the outer ends of the struts are fitted with sleeve members slidingly to receive the peg means.

5. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of aerofoil cross-section struts each having leading and trailing edges and a pair of oppositely and circumferentially-facing surfaces extending from its leading edge to its trailing edge and each extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and that circumferentially-facing surface of each of said adjacent pair of said struts which faces the other of said adjacent pair of said struts, and integral joints interconnecting said pressings.

6. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of aerofoil cross-section struts each having leading and trailing edges and a pair of oppositely and circumferentially-facing surfaces extending from its leading edge to its trailing edge and each extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and that circumferentially-facing surface of each of said adjacent pair of said struts which faces the other of said adjacent pair of said struts, and weld metal interconnecting said pressings.

7. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of aerofoil cross-section struts each having leading and trailing edges and a pair of oppositely and circumferentially-facing surfaces extending from its leading edge to its trailing edge and an end surface, and each extending outwardly across said passage from said annular wall to said outer tubular wall with said end surface lying close to said outer tubular wall; and said inner wall unit comprising a plurality of metal pressings equal in number to said plurality of struts, each said pressing providing in one piece that portion of the annular wall which interconnects an adjacent pair of said struts, that circumferentially-facing surface of each of said adjacent pair of said struts which faces the other of the adjacent pair of struts, and a portion of the end surface of each of said struts, and integral joints interconnecting said pressings.

8. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of aerofoil cross-section struts each having leading and trailing edges and a pair of oppositely and circumferentially-facing surfaces extending from its leading edge to its trailing edge and an end surface, and each extending outwardly across said passage from said annular wall to said outer tubular wall with said end surface lying close to said outer tubular wall; and said inner wall unit comprising a plurality of metal pressings equal in number to said plurality of struts, each said pressing providing in one piece that portion of the annular wall which interconnects an adjacent pair of said struts, that circumferentially-facing surface of each of said adjacent pair of said struts which faces the other of the adjacent pair of struts, and a portion of the end surface of each of said struts, and integral joints interconnecting said pressings; comprising also means to position said inner wall unit axially and circumferentially within said outer tubular wall comprising peg means mounted on said outer tubular wall and engaging apertures in the end surfaces of said struts.

9. An exhaust duct structure as claimed in claim 8, wherein the apertures in said end surfaces of said struts are fitted with sleeves to be slidingly engaged with the peg means.

10. An exhaust duct structure comprising an outer tubular wall and an inner wall unit supported coaxially within said outer tubular wall; said inner wall unit affording a conical wall to cooperate with said outer tubular wall to define therebetween an annular fluid passage, and a plurality of struts extending outwardly across said passage from said conical wall to said outer tubular wall; and said inner wall unit comprising a plurality of metal pressings equal in number to said plurality of struts, each said pressing providing in one piece that portion of the conical wall which interconnects an adjacent pair of said struts and a portion of each of said adjacent pair of said struts, and integral joints interconnecting said metal pressings.

11. An exhaust duct structure comprising an outer tubular wall and an inner wall unit supported coaxially within said outer tubular wall; said inner wall unit affording a conical wall to cooperate with said outer tubular wall to define therebetween an annular fluid passage, and a plurality of struts extending outwardly across said passage from said conical wall to said outer tubular wall; and said inner wall unit comprising a plurality of metal pressings equal in number to said plurality of struts, each said pressing providing in one piece that portion of the conical wall which interconnects an adjacent pair of said struts and a portion of each of said adjacent pair of said struts, and weld metal interconnecting said pressings.

12. An exhaust duct structure comprising an outer tubular wall and an inner wall unit supported coaxially within the outer tubular wall; said inner wall unit affording a conical wall to cooperate with said outer tubular wall to define therebetween an annular fluid passage, and a plurality of aerofoil cross-section struts each having a leading edge, a trailing edge, a pair of oppositely and circumferentially-facing surfaces extending from said leading edge to said trailing edge, and an end surface at the outer end thereof, and each said strut extending outwardly across said annular fluid passage from said conical wall to said outer tubular wall with the end surface lying close to said outer tubular wall; and said inner wall unit comprising a plurality of metal pressings equal in number to said plurality of struts, each said pressing providing in one piece that portion of said conical wall which interconnects an adjacent pair of said struts, that circumferentially-facing surface of each of said adjacent pair of said struts which faces the other of said adjacent pair of said struts, and a portion of said end surface of each of said adjacent pair of said struts, and weld metal interconnecting said pressings.

13. An exhaust duct structure as claimed in claim 12, wherein said conical wall terminates short of the apex of the cone and wherein the apex of the cone is formed by a conical cup secured to the narrower end of said conical wall.

14. An exhaust duct structure as claimed in claim 12, wherein the base end of said conical wall is afforded by an annular wall secured in overlapping relation to the adjacent ends of said pressings.

15. An exhaust duct structure comprising an outer tubular wall and an inner wall unit supported coaxially withiin the outer tubular wall; said inner wall unit affording a conical wall to cooperate with said outer tubular wall to define therebetween an annular fluid passage, and a plurality of aerofoil cross-section struts each having a leading edge, a trailing edge, a pair of oppositely and circumferentially-facing surfaces extending from said leading edge to said trailing edge, and an end surface at the outer end thereof, and each said strut extending outwardly across said annular fluid passage from said conical wall to said outer tubular wall with the end surface lying close to said outer tubular wall; and said inner wall unit comprising a plurality of metal pressings equal in number to said plurality of struts, each said pressing providing in one piece that portion of said conical wall which interconnects an adjacent pair of said struts, that circumferentially-facing surface of each of said adjacent pair of said struts which faces the other of said adjacent pair of said struts, and a portion of said end surface of each of said adjacent pair of said struts, and weld metal interconnecting said pressings; and means to position said inner wall unit axially and circumferentially with respect to said outer tubular wall comprising plug elements secured to said outer tubular wall and engaging in apertures in said end surfaces of said struts.

16. An exhaust duct structure as claimed in claim 15, comprising also cylindrical liners fitted within said apertures in the end surfaces of said struts slidingly to receive said plug elements.

17. A working fluid duct structure comprising an outer tubular wall and an inner wall unit supported coaxially within said outer tubular wall; said inner wall unit affording an annular wall to cooperate with said outer tubular wall to define therebetween an annular fluid passage, and a plurality of struts extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and a portion of each of said adjacent pair of said struts, and integral joints interconnecting said metal pressings.

LIONEL HAWORTH.

References Cited in the file of this patent

UNITED STATES PATENTS

| Number | Name | Date |
|---|---|---|
| 2,483,401 | Cole | Oct. 4, 1949 |
| 2,508,420 | Redding | May 23, 1950 |
| 2,516,819 | Whittle | July 25, 1950 |